US012577066B2

(12) United States Patent
Seal et al.

(10) Patent No.: US 12,577,066 B2
(45) Date of Patent: Mar. 17, 2026

(54) SYSTEM AND METHOD FOR MOUNTING FIXTURES ON AN INDEPENDENT CART

(71) Applicant: Rockwell Automation Technologies, Inc., Mayfield Heights, OH (US)

(72) Inventors: Shankha S. Seal, Milwaukee, WI (US); Eric M. Gardner, Milwaukee, WI (US); Jamie J. Cechvala, Wauwatosa, WI (US); Robert H. Schmidt, Germantown, WI (US); Arun K. Guru, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 748 days.

(21) Appl. No.: 17/899,843

(22) Filed: Aug. 31, 2022

(65) Prior Publication Data

US 2024/0067238 A1     Feb. 29, 2024

(51) Int. Cl.
| | |
|---|---|
| *B65G 54/02* | (2006.01) |
| *B61B 13/04* | (2006.01) |
| *B61G 5/10* | (2006.01) |
| *H02K 41/03* | (2006.01) |

(52) U.S. Cl.
CPC .............. *B65G 54/02* (2013.01); *B61B 13/04* (2013.01); *B61G 5/10* (2013.01); *H02K 41/031* (2013.01)

(58) Field of Classification Search
CPC ........ B65G 54/02; H02K 41/031; B61G 5/10; B61B 13/04
See application file for complete search history.

(56) References Cited

U.S. PATENT DOCUMENTS

| | | | | |
|---|---|---|---|---|
| 6,876,107 | B2 * | 4/2005 | Jacobs .............. | B29C 66/83413 |
| | | | | 318/135 |
| 10,985,685 | B1 | 4/2021 | Sun et al. | |
| 11,097,628 | B2 | 8/2021 | Blair et al. | |
| 11,848,632 | B2 | 12/2023 | Muellerschoen | |
| 2013/0084157 | A1 | 4/2013 | Staunton et al. | |
| 2021/0253374 | A1 * | 8/2021 | Elsperger ............. | H02K 41/031 |
| 2021/0384765 | A1 | 12/2021 | Das | |
| 2022/0219920 | A1 | 7/2022 | Hahn | |

FOREIGN PATENT DOCUMENTS

WO        2021214124 A1    10/2021

OTHER PUBLICATIONS

Extended European Search Report for Application No. 23184130.5 dated Dec. 22, 2023 (8 pages).
English Translation of 1st Chinese Office Action for application No. 202311002690.X issued on Jan. 14, 2026 (7 pages).

* cited by examiner

*Primary Examiner* — James R Bidwell
(74) *Attorney, Agent, or Firm* — Boyle Fredrickson, S.C.

(57) ABSTRACT

A mover for an independent cart system includes a drive member for a linear drive system, a power source configured to supply electrical power to at least one device mounted on the mover, and a mounting plate secured to the mover. The mounting plate is configured to selectively receive one of multiple fixtures. The mounting plate includes at least one electrical connector configured to engage a complementary electrical connector on each of the fixtures, at least one connector configured to engage a complementary connector on each of the fixtures to positively retain each of the fixtures to the mounting plate, and a control circuit operative to either transfer at least one control signal to or receive at least one feedback signal from each of the fixtures.

16 Claims, 14 Drawing Sheets

SYSTEM AND METHOD FOR MOUNTING FIXTURES ON AN INDEPENDENT CART

BACKGROUND INFORMATION

The subject matter disclosed herein relates to a system and method for mounting fixtures on an independent cart system. More specifically, a vehicle in an independent cart system includes a base plate providing electrical and mechanical connectors for a quick interchange of different fixtures configured to mount to the base plate.

Motion control systems utilizing independent carts and linear motors can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, also referred to herein as "movers", each supported on a track for motion along the track. The track is made up of a number of track segments, and a linear drive system controls operation of the movers, causing the movers to travel along the track. Sensors may be spaced at fixed positions along the track and/or on the movers to provide information about the position and speed of the movers.

In a typical system, the track forms a path over which each mover repeatedly travels. In some applications, other actuators may interact with a product loaded on each mover as the mover travels along the track. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover.

In other applications, the movers may have fixtures which include sensors, actuators, or tooling mounted on the mover and the movers may be configured to interact with product as the movers travel along the track. For example, the mover may have a gripper mounted on the mover. As the mover travels along the track, it may pass a series of shelfs or bins each containing a different product. The gripper may be programmed to retrieve the product from move a particular shelf or bin and to deliver the product to an assembly station or to a packaging station for further processing. Other movers may include, for example, a labelling device configured, for example, to stamp or roll a label onto a product. The track may be positioned adjacent to another track or conveyor system, and each mover may include a different label. The movers may be moved into a labelling position adjacent the other track or conveyor to place the correct label on different product passing by the labelling position.

Historically, it has been known to provide a different mover for each function that is required in an application. With respect to the gripper example, a different gripper may be required to handle different parts. Each gripper may require a different clamp shape, size, or orientation. A single gripper may be mounted to a mover, and multiple movers are required to receive each gripper in the system. With respect to the labelling example, different labels may have different widths, lengths, or application requirements. A different label applicator may be mounted to each mover, and multiple movers are required to accommodate each label applicator. Requiring dedicated movers for each actuator requires track space for each mover. The track may need to have additional length or a branch on which unused movers may be positioned. Additional time may be required to select a desired actuator as the movers with a gripper or label applicator not being used are repositioned out of the way of the desired actuator.

Thus, it would be desirable to provide a system for selectively mounting multiple different fixtures to a single mover.

It would also be desirable to provide for a quick changeover between the different fixtures.

BRIEF DESCRIPTION

According to one embodiment of the invention, a mover for an independent cart system includes a drive member for a linear drive system, a power source configured to supply electrical power to at least one device mounted on the mover, and a mounting plate secured to the mover. The mounting plate is configured to selectively receive one of multiple fixtures. The mounting plate includes at least one electrical connector configured to engage a complementary electrical connector on each of the fixtures, at least one connector configured to engage a complementary connector on each of the fixtures to positively retain each of the fixtures to the mounting plate, and a control circuit operative to either transfer at least one control signal to or receive at least one feedback signal from each of the fixtures.

According to another embodiment of the invention, an apparatus for selectively mounting a fixture on a mover for an independent cart system includes a mounting plate secured to the mover. The mounting plate further includes at least one electrical connector configured to engage a complementary electrical connector on each of multiple fixtures, at least one connector configured to engage a complementary connector on each of the fixtures to positively retain each of the fixtures to the mounting plate, and a control circuit operative to communicate at least one control signal between the mounting plate and each of the fixtures.

According to still another embodiment of the invention, a method for selectively mounting a fixture on a mover for an independent cart system includes aligning the mover with the fixture selected from multiple fixtures, mounting the fixture to a mounting plate on the mover, and securing the fixture to the mounting plate by engaging a complementary connector on the fixture to at least one connector on the mounting plate. The mounting plate includes at least one electrical connector configured to engage a complementary electrical connector on the fixture. The at least one connector is configured to engage the complementary connector on the fixture to positively retain the fixture to the mounting plate. A control circuit is operative to communicate at least one control signal between the mounting plate and the fixture.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
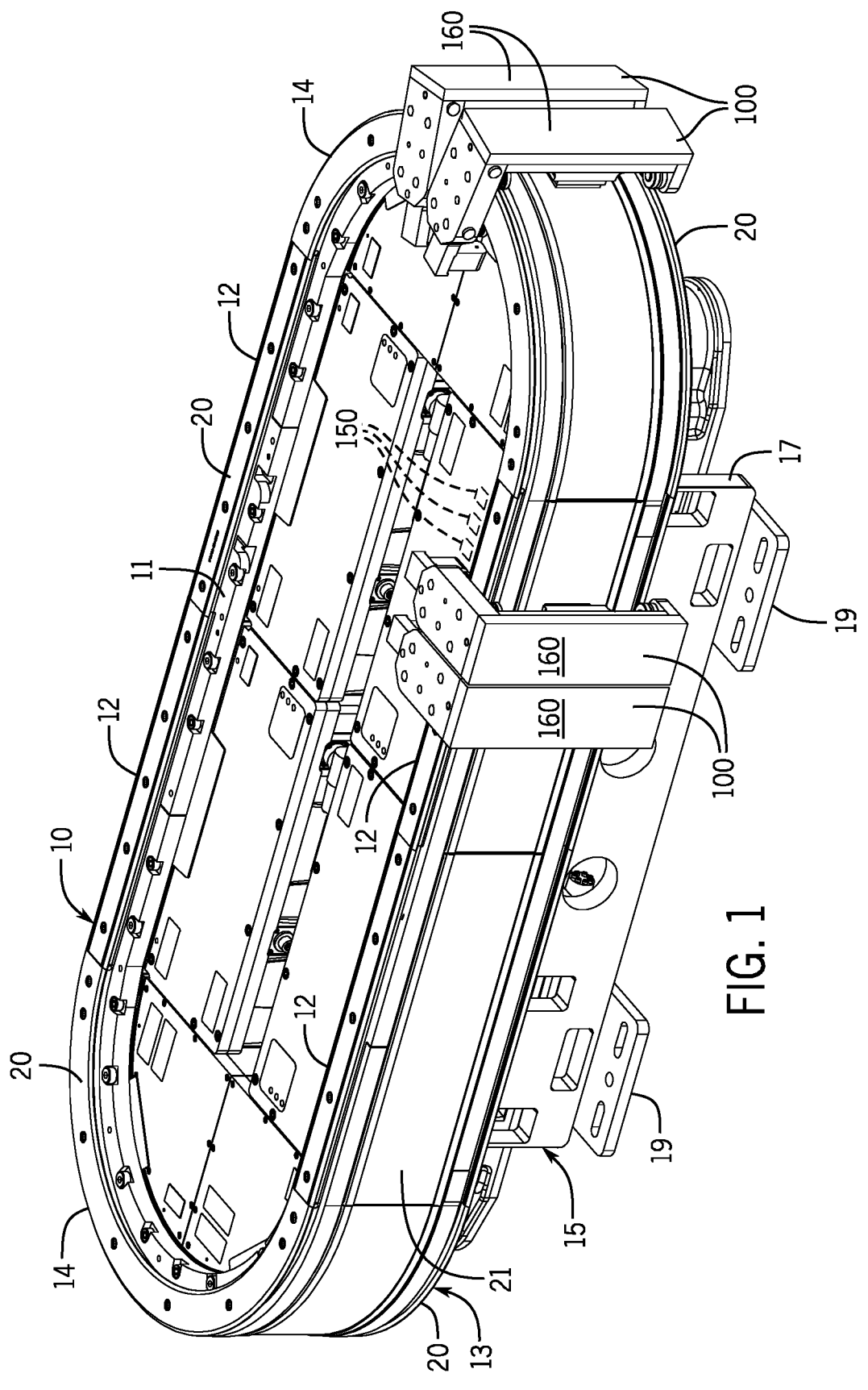
FIG. 1 is an isometric view of an exemplary linear cart system incorporating multiple movers travelling along a curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes a system for selectively mounting multiple different fixtures to a single mover. A baseplate is mounted on the mover providing a configurable housing to which different fixtures are mounted. The baseplate may include one or more power modules, control modules, and/or communication modules. One or more electrical connectors are provided to which a complementary connector on each fixture is connected. The electrical connectors may transmit control signals from the baseplate to the fixture, receive feedback signals from the fixture to the baseplate, or communicate data packets between the baseplate and the fixture. A latching assembly is provided to secure each fixture to the baseplate. The latching assembly may include a clip-style connector with an actuated release or actuated connector. Optionally, the latching assembly may include an electromagnetic assembly or threaded fasteners that may be manually or automatically inserted. According to still another option, a combination of latching assemblies may be utilized to secure each fixture to the modular baseplate.

To facilitate a quick changeover between the different fixtures, a fixture changeover station may be provided. The fixture changeover station may include fixture storage with multiple mounting locations for different fixtures. According to one aspect of the invention, the fixture station may be positioned adjacent to the track and a mover having a modular baseplate is selectively positioned by each desired fixture. If a fixture is already mounted on the mover, the mover is first positioned by an empty fixture location such that the mounted fixture may be transferred back to the fixture station. The mover is repositioned by a desired fixture, and the desired fixture is transferred on to the mover. According to another aspect of the invention, the fixture station may include a multi-axis fixture changer. The mover is positioned by the fixture station such that the fixture changer may reach the modular baseplate. The fixture changer engages a fixture mounted on the baseplate or at each location of the fixture station. The fixture changer loads and unloads a fixture on the mover or the fixture station according to a desired fixture for the mover.

Figure 2:
FIG. 2 is an isometric view of an exemplary linear cart system incorporating multiple movers travelling along a curvilinear track according to another embodiment of the present invention.
Figure 3:
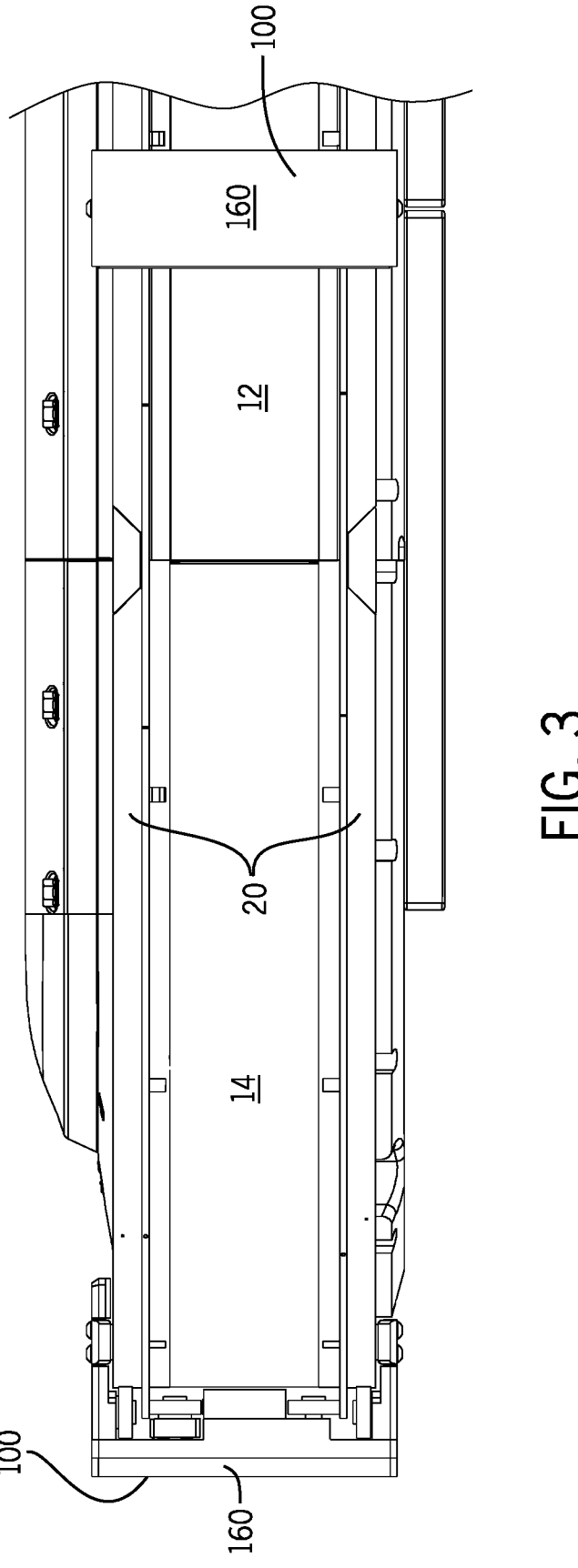
FIG. 3 is a partial side elevation of the linear cart system of FIG. 2.

Turning initially to FIGS. 1-3, two embodiments of an exemplary transport system for moving articles or products are illustrated. The transport system includes a track 10 made up of multiple segments 12, 14. According to the illustrated embodiments, the segments define a generally closed loop supporting a set of movers 100 movable along the track 10. The illustrated tracks 10 each include four straight segments 12 with two straight segments 12 located along each side of the track and spaced apart from the other pair. The tracks 10 also include four curved segments 14 where a pair of curved segments 14 is located at each end of the track 10 to connect the pairs of straight segments 12. The four straight segments 12 and the four curved segments 14 form a generally oval track and define a closed path over which each of the movers 100 may travel. It is understood that track segments of various sizes, lengths, and shapes may be connected together to form a track 10 without deviating from the scope of the invention.

In FIG. 1, the track 10 is oriented in a horizontal plane and supported above the ground by a base 15 extending vertically downward from the track 10. The base 15 includes a pair of generally planar support plates 17, located on opposite sides of the track 10, with mounting feet 19 on each support plate 17 to secure the track 10 to a surface. In FIG. 2, the track 10 is shown without a base. It is contemplated that the tracks 10 may be installed in different orientations, such as sloped or vertical, and include different shaped segments including, but not limited to, straight segments, inward bends, outward bends, up slopes, down slopes and various combinations thereof. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. The movers 100 will travel along the track and take various orientations according to the configuration of the track 10 and the relationships discussed herein may vary accordingly.

Each track segment 12, 14 includes a number of independently attached rails 20 on which each mover 100 runs. According to the illustrated embodiments, rails 20 extend generally along the outer periphery of the track 10. A first rail 20 extends along an upper surface 11 of each segment and a second rail 20 extends along a lower surface 13 of each segment. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the dimensions of the track 10 and span only a partial width of the surface of the track 10 on which it is attached.

Figure 5:
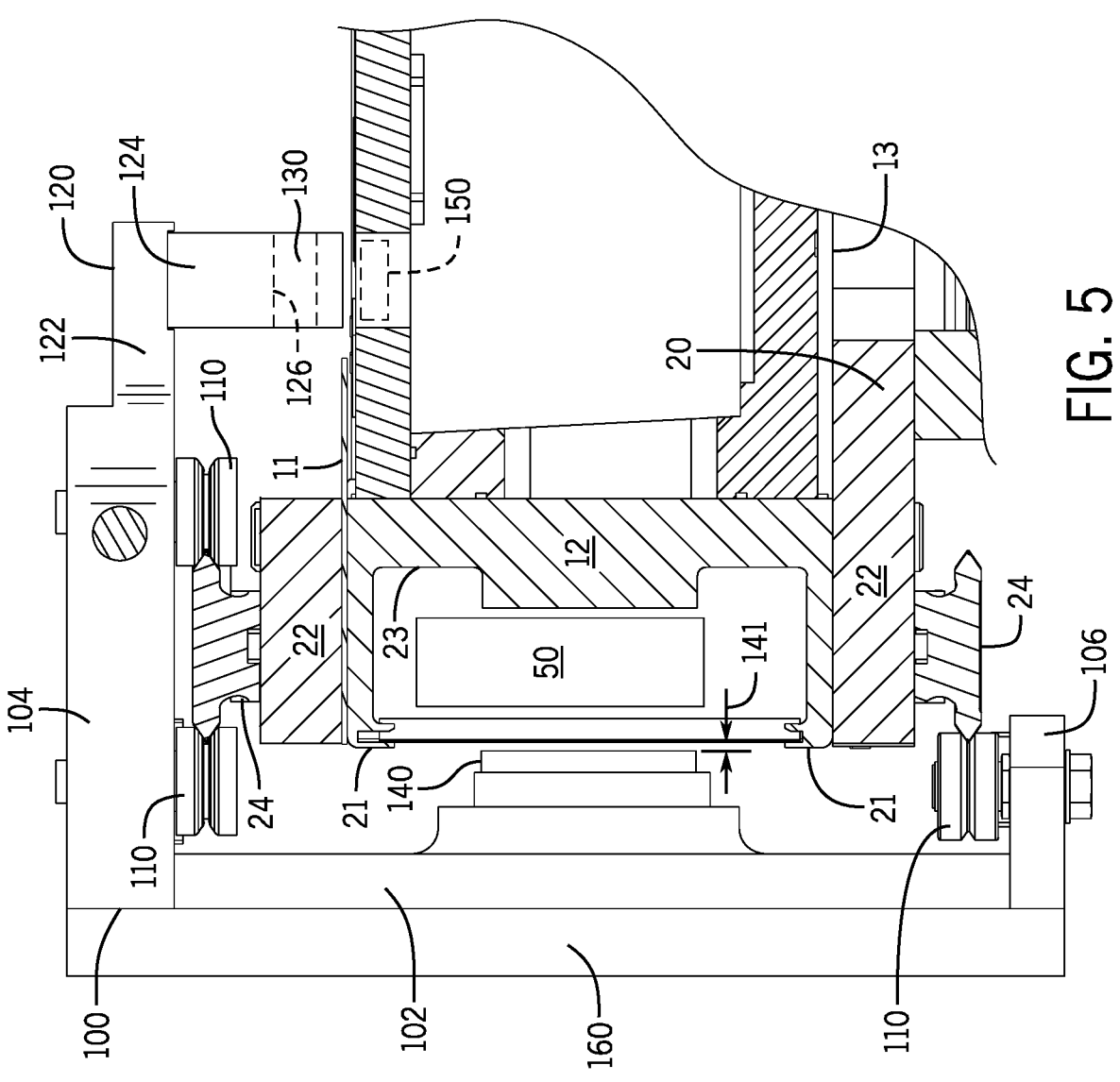
FIG. 5 is a partial sectional view of the transport system of FIG. 1.
Figure 6:
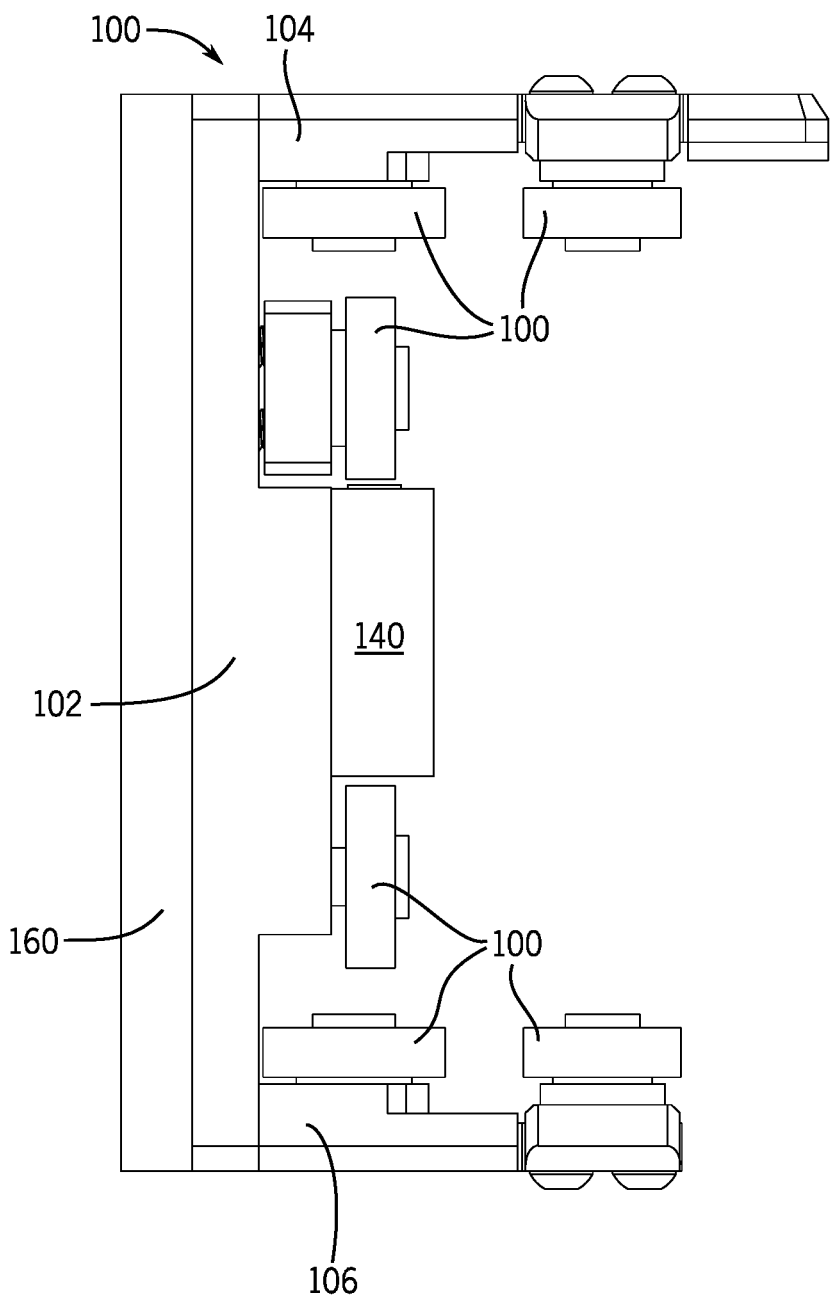
FIG. 6 is a side elevational view of a mover from the transport system of FIG. 2.

With reference also to FIG. 5, a first embodiment of the rail 20 includes a base portion 22 mounted to the track segment and a track portion 24 along which the mover 100 runs. Each mover 100 includes complementary rollers 110 to engage the track portion 24 of the rail 20 for movement along the track 10. Each side of the track portion 24 is wedge-shaped and each roller 110 includes a complementary groove configured to receive the wedge-shaped side of the track portion.

Figure 7:
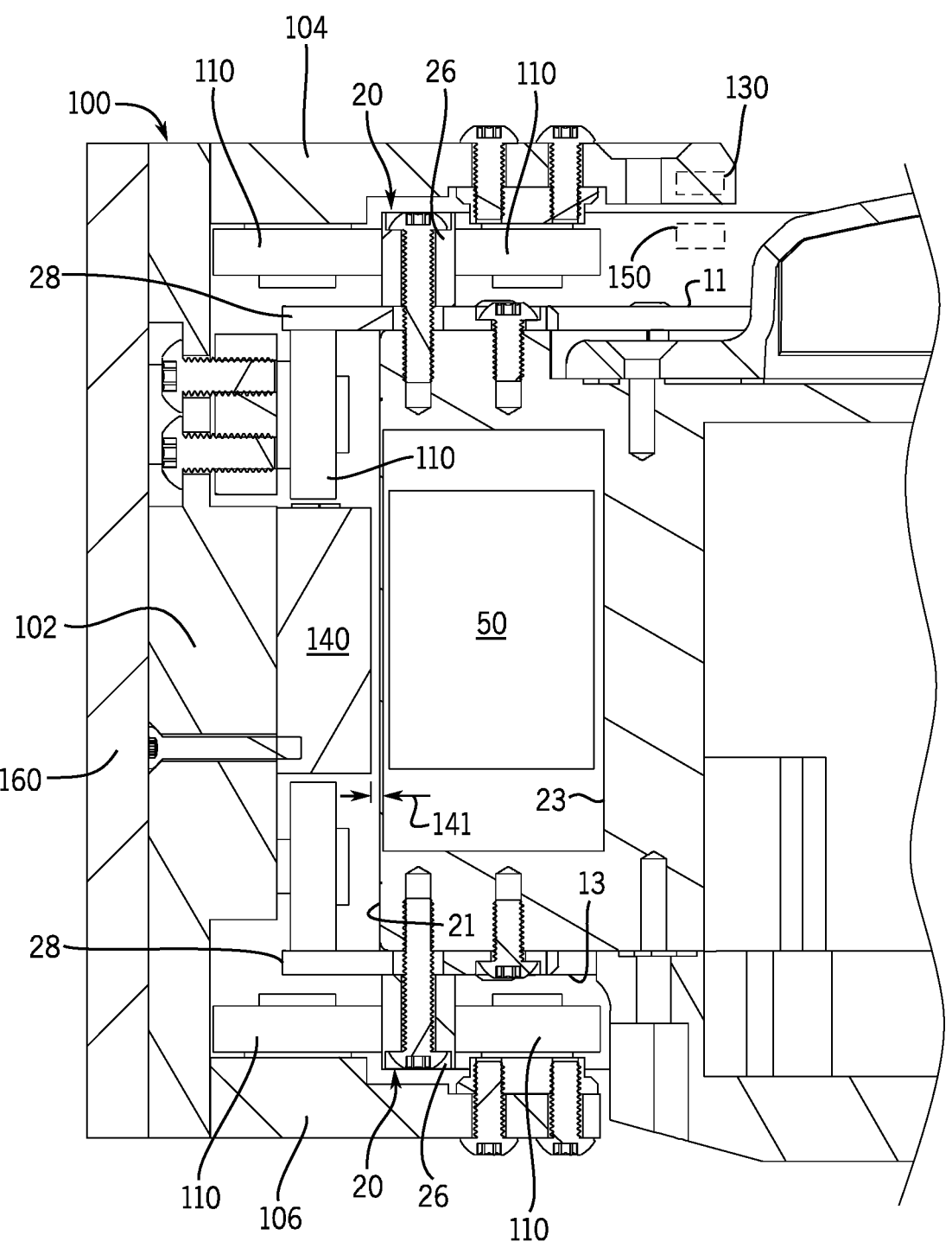
FIG. 7 is a partial sectional view of the transport system of FIG. 2.

With reference also to FIG. 7, a second embodiment of the rail 20 includes two track portions 26, 28, where a first track portion 26 is generally rectangular and is positioned along the top surface 11 of the track. A second track portion 28 is generally rectangular and is positioned to protrude from the side of the track generally orthogonal to the first track portion 26. First and second rollers 110 engage each side of the first track portion 26 of the upper rail, and a third roller 110 engages one surface of the second track portion 28 of the upper rail. The first track portion 26 of a lower rail 20 is along the lower surface 13 of the track and fourth and fifth rollers 110 engage each side of the first track portion 26 of the lower rail. The second track portion 28 of the lower rail 20 protrudes from the side of the track segment orthogonally to the orientation of the first track portion 26, and a sixth roller 110 engages one surface of the second track portion 28 of the lower rail.

One or more movers 100 are mounted to and movable along the rails 20 on the track 10. With reference again to FIG. 5, a first embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102.

A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100.

The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted within the top surface 11 of the track segment. Each mover 100 further includes a mounting plate 160 fastened to the side member 102. The mounting plate 160 faces outward from the track 10 when the mover 100 is mounted on the track. The mounting plate 160 is configured to selectively receive one of multiple different fixtures and to provide a uniform interface for connecting tools to the mover 100, as will be discussed in more detail below.

With reference again to FIG. 7, a second embodiment of an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. According to the illustrated embodiment, a position magnet 130 is mounted within the top member 104 and is configured to align with a sensor 150 mounted within the top surface 11 of the track segment. Each mover 100 further includes a mounting plate 160 fastened to the side member 102. The mounting plate 160 faces outward from the track 10 when the mover 100 is mounted on the track. The mounting plate 160 is configured to selectively receive one of multiple different fixtures and to provide a uniform interface for connecting tools to the mover 100, as will be discussed in more detail below.

A first set of rollers 110 are mounted on the lower side of the top member 104 and are configured to engage either side of the first track portion 26 of the rail 20 mounted to the upper surface 11 of the track segment. According to the illustrated embodiment two pairs of rollers 110 are mounted to the lower side of the top member 104 with a first pair located along a first side of the first track portion 26 and a second pair located along a second side of the first track portion 26 of the upper rail 20. A third pair of rollers 110 are mounted on the side member 102 and extend below the second track portion 28 of the upper rail. The bottom member 106 extends generally orthogonal to the side member 102 at a bottom end of the side member 102 and extends for a distance sufficient to receive a fourth and fifth pair of rollers 110 along the bottom of the mover 100. The fourth and fifth pair of rollers 110 each engage one side of the first track portion 26 of the lower rail 20. A sixth pair of rollers 110 are mounted on the side member 102 and extend above the second track portion 28 of the lower rail. The rollers 110 act together to engage the various surfaces of the rails 20 to both allow the mover 100 to travel along the rails 20 and to maintain the orientation of the mover 100 with respect to the track 10

With reference to both FIGS. 5 and 7, a linear drive system is incorporated in part on each mover 100 and in part within each track segment 12, 14 to control motion of each mover 100 along the segment. Coils 50 (see also FIG. 8) mounted along the length of the track 10 serve as first drive members. Each mover 100 includes a second drive member 140 which is configured to interact with electromagnetic fields generated by the coils 50 to propel the mover 100 along the track 10. It is contemplated that the drive members 140 on each mover 100 may be drive magnets, steel back iron and teeth, conductors, or any other suitable member that will interact with the electromagnetic fields generated by the coils 50. Commonly, the drive member 140 on each mover 100 includes permanent magnets which emit a magnetic field. The magnetic field generated by the drive member 140 on each mover 100 improves the mover interaction with the electromagnetic field generated by the coils 50 in comparison to a magnetically salient structure that has no magnetic field. For convenience, the invention will be discussed with respect to drive magnets 140 being used as the drive member within each mover 100. However, it is understood that the other magnetically salient structures may be employed without deviating from the scope of the invention.

Figure 8:
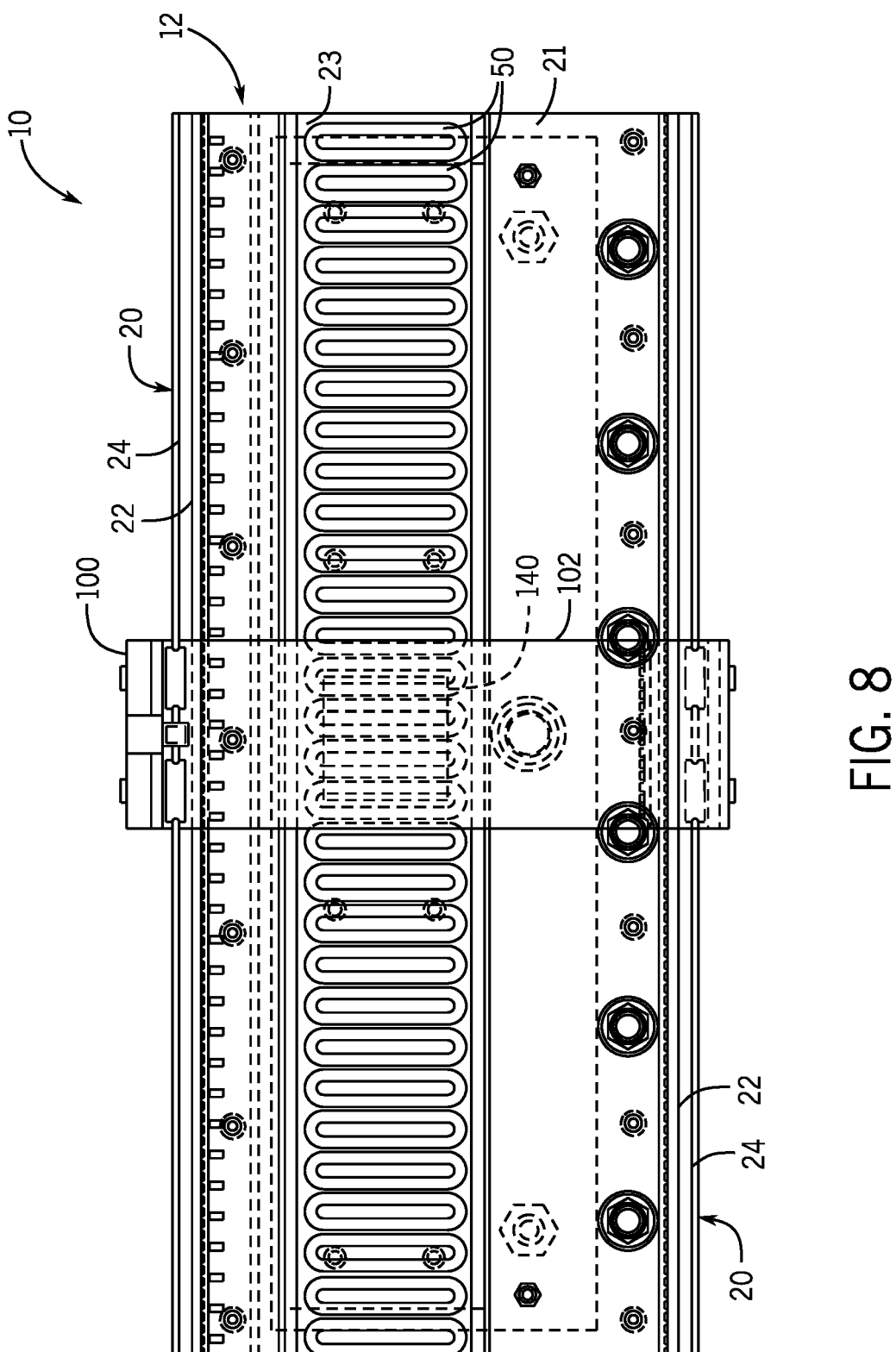
FIG. 8 is a partial side elevation view of one segment of one embodiment of the linear cart system of FIG. 1 illustrating activation coils distributed along one surface of the track segment.

With reference to FIG. 8, a series of coils 50 are positioned along the length of the track 10. Each mover 100 includes at least one drive magnet 140 configured to interact with an electromagnetic field generated in the coils. Successive activation of the coils 50 establishes a moving electromagnetic field that interacts with the magnetic field generated by each permanent magnet 140 mounted on the movers 100 and that causes the mover 100 to travel along the track 10. Controlled voltages are applied to each coil 50 to achieve desired operation of the movers. The drive magnets 140 are mounted on the inner surface of the side member 102 and when mounted to the track 10 are spaced apart from a series of coils 50 extending along the track 10. As shown in FIGS. 5 and 7, an air gap 141 is provided between each set of drive magnets 140 and the coils 50 along the track 10. According to the illustrated embodiment, each coil 50 is placed in a channel 23 extending longitudinally along one surface of the track segment 12. The electromagnetic field generated by each coil 50 spans the air gap 141 and interacts with the drive magnets 140 mounted to the mover 100 to control operation of the mover 100.

Figure 9:
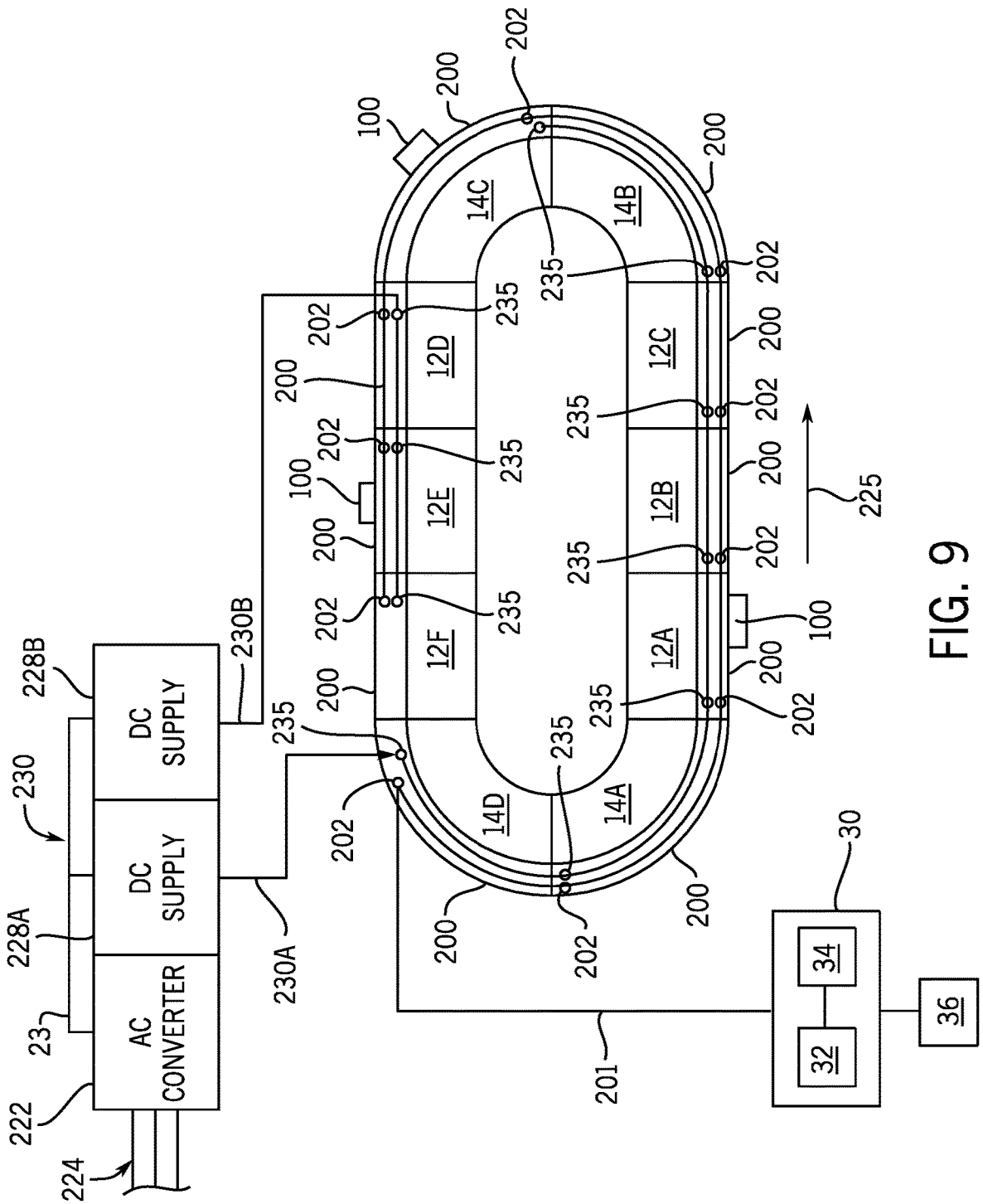
FIG. 9 is a block diagram representation of an exemplary power and control system for the transport system of FIGS. 1 and 2.

Turning next to FIG. 9, an exemplary power and control system for the track 10 and linear drive system is illustrated. A segment controller 200 is mounted within each track segment 12, 14. The segment controller 200 receives command signals from a system controller 30 and generates switching signals for power segments which, in turn, control activation of each coil 50. Activation of the coils 50 are controlled to drive and position each of the movers 100 along the track segment 12 according to the command signals received from the system controller 30.

The illustrated motion control system includes a system controller 30 having a processor 32 and a memory device 34. It is contemplated that the processor 32 and memory device 34 may each be a single electronic device or formed from multiple devices. The processor 32 may be a microprocessor. Optionally, the processor 32 and/or the memory device 34 may be integrated on a field programmable array (FPGA) or an application specific integrated circuit (ASIC). The memory device 34 may include volatile memory, non-volatile memory, or a combination thereof. The system controller 30 could be a Programmable Logic Controller (PLC). A user interface 36 is provided for an operator to configure the system controller 30 and to load or configure desired motion profiles for the movers 100 on the system controller 30. It is contemplated that the system controller 30 and user interface 36 may be a single device, such as a laptop, notebook, tablet or other mobile computing device. Optionally, the user interface 36 may include one or more separate devices such as a keyboard, mouse, display, touchscreen, interface port, removable storage medium or medium reader and the like for receiving information from and displaying information to a user. Optionally, the system controller 30 and user interface 36 may be integrated into an industrial computer mounted within a control cabinet and configured to withstand harsh operating environments. It is contemplated that still other combinations of computing devices and peripherals as would be understood in the art may be utilized or incorporated into the system controller 30 and user interface 36 without deviating from the scope of the invention.

One or more programs may be stored in the memory device 34 for execution by the processor 32. The system controller 30 receives one or more motion profiles for the movers 100 to follow along the track 10. A program executing on the processor 32 is in communication with a segment controller 200 on each track segment 12 via a control network 201, such as an EtherNet/IP network. The system controller 30 may transfer a desired motion profile to each segment controller 200 or, optionally, the system controller 30 may perform some initial processing based on the motion profile to transmit a segment of the motion profile to each segment controller 200 according to the portion of the motion profile to be executed along that segment. Optionally, the system controller 30 may perform still further processing on the motion profile and generate a desired switching sequence for each segment 12 that may be transmitted to the segment controller 200.

A gateway 202 in each segment controller 200 receives the communications from the system controller 30 and passes the communication to a processor executing in the segment controller 200. According to the embodiment illustrated in FIG. 9, the industrial network 201 is configured in a daisy chain configuration. The system controller 30 is connected to the gateway 202 in one segment 14D and the gateways 202 in each of the other segments are serially connected via connectors between segments. Optionally, the industrial network 201 may be configured in a star topology, where the system controller 30 is connected directly to the gateway 202 in each segment controller 200. According to still other embodiments, the industrial network 201 may be configured in a combination of serial or parallel configurations according to the application requirements. The processor may be a microprocessor. Optionally, the processor and/or a memory device within the segment controller 200 may be integrated on a field programmable array (FPGA) or an application specific integrated circuit (ASIC). It is contemplated that the processor and memory device may each be a single electronic device or formed from multiple devices. The memory device may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12 controlled by that system controller 30.

According to the illustrated embodiment, an AC converter 222 can receive a single or multi-phase AC voltage 224 from a power grid. The AC converter 222, in turn, converts the AC voltage to a DC voltage using an active or passive rectifier front end. The DC voltage may be passed between the AC converter 222 and one or more DC power supplies 228 via DC bus bars 231, defining, at least in part a DC bus 230 for the power system. The DC supply 228, in turn, can provide a distributed DC bus 230 from the power supply 228 to input terminals of the track segments 12. The DC supply 228 may be configured to regulate the DC voltage at generally the same voltage level provided from the AC converter 222. Alternately, the DC supply 228 may be configured as either a buck or boost converter to lower or raise the voltage level from that provided by the AC converter 222. According to yet another embodiment of the invention, the DC supply 228 may be configured as a buck-boost converter that is able to selectively regulate the DC voltage at the current level, raise the voltage level, or lower the voltage level.

The DC bus 230 is then provided from the DC supply 228 to each track segment 12, 14. According to the illustrated embodiment, a first DC supply 228A provides a first voltage on a first DC bus 230A to a DC bus connection 235 on one of the curved track segments 14D. Each DC bus connection 235 may be configured to either receive a DC voltage externally from a DC supply 228 or via an internal connection between adjacent track segments 12, 14. The first DC bus 230A is connected between each of the curved track segments 14 and to three of the straight track segments 12A, 12B, and 12C. A second DC supply 228B provides a second voltage on a second DC bus 230B to one of the straight track segments 12D. The remaining straight track segments 12E and 12F each receive the voltage on the second DC bus 230B via internal connections between the adjacent segments.

Figure 10:
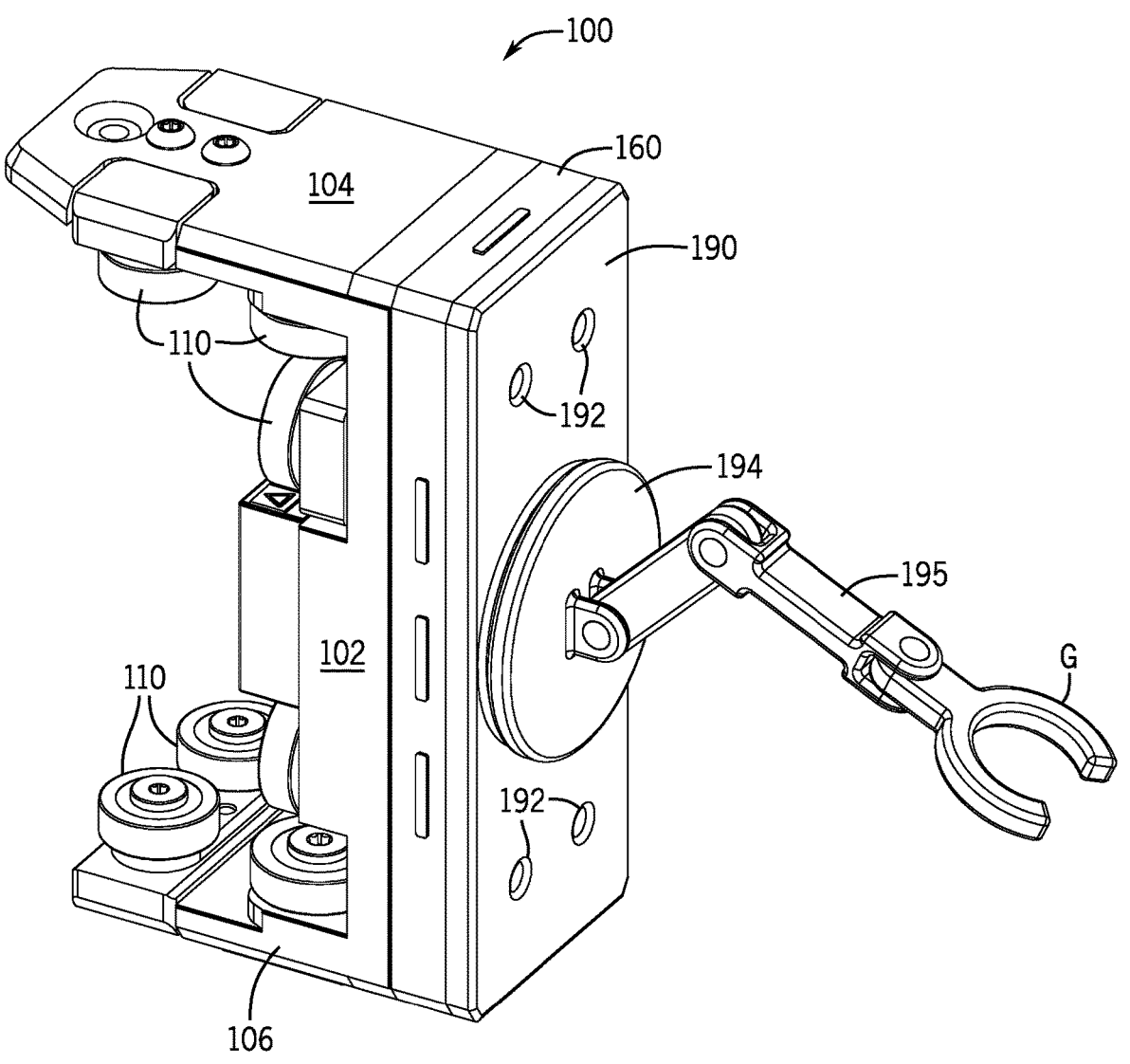
FIG. 10 is a perspective view of a mover from the transport system of FIG. 2 with a gripper arm mounted to a modular baseplate according to one embodiment of the invention.
Figure 11:
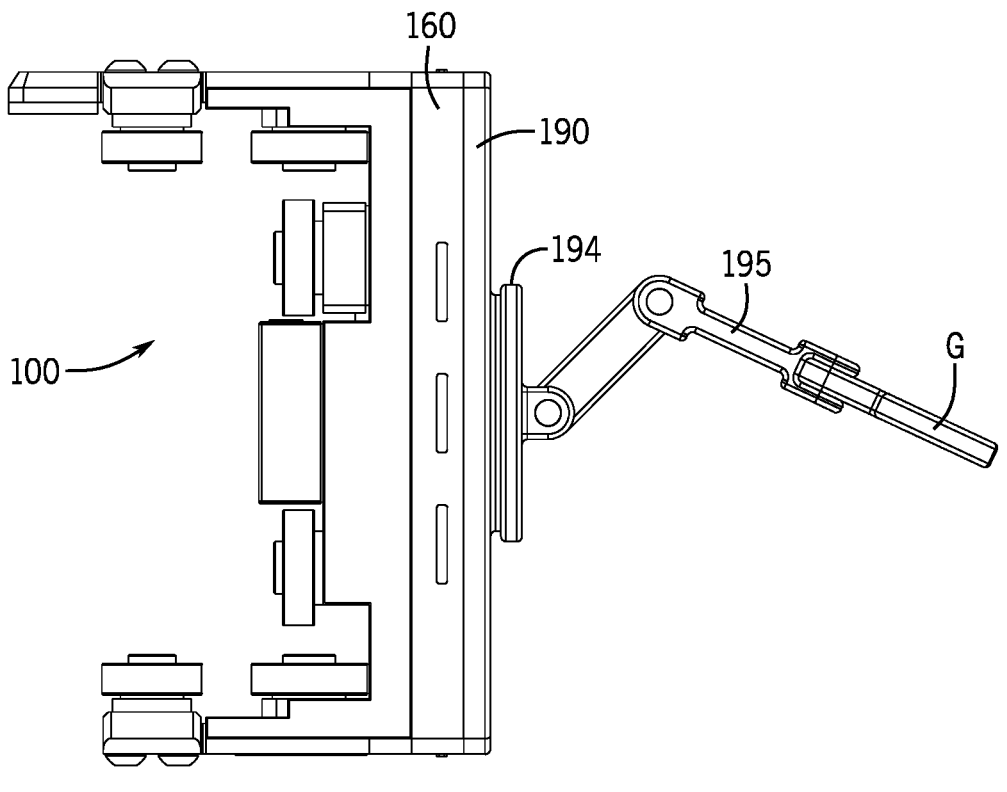
FIG. 11 is a side elevation view of the mover and gripper arm of FIG. 10.

Turning next to FIGS. 10 and 11, a mover 100 with an exemplary robotic arm 195 and gripper, G, is shown mounted to the baseplate 160. The robotic arm 195 is mounted to a first base 194. The base 194 will be used generically herein to indicate a tool or fixture to be mounted to the mover 100. Different bases 194 may accommodate different tools or fixtures and have different functions according to application requirements. Tools may be mounted which provide for gripping, labelling, scanning, and the like. The fixtures may include sensors providing analytics of the operation of each mover 100 including, but not limited to, an accelerometer, gyroscope, light emitting diodes (LEDs) as visual indicators, machine vision system, and the like. The fixtures may also provide safety in the independent cart system by enabling proximity sensors, light curtains, secondary encoders, and the like. The base 194 is mounted to or integrally formed with a secondary mounting plate 190. The secondary mounting plate 190 is complementary to the mounting plate 160 affixed to the mover 100 and provides for quick changeover between tools or fixtures to be mounted to a mover. Mounting holes 192 are shown extending through the secondary mounting plate 190. The mounting holes 192 provide one exemplary method of securing the secondary mounting plate 190 to the mounting plate 160 on the mover 100.

Figures 13, 14:
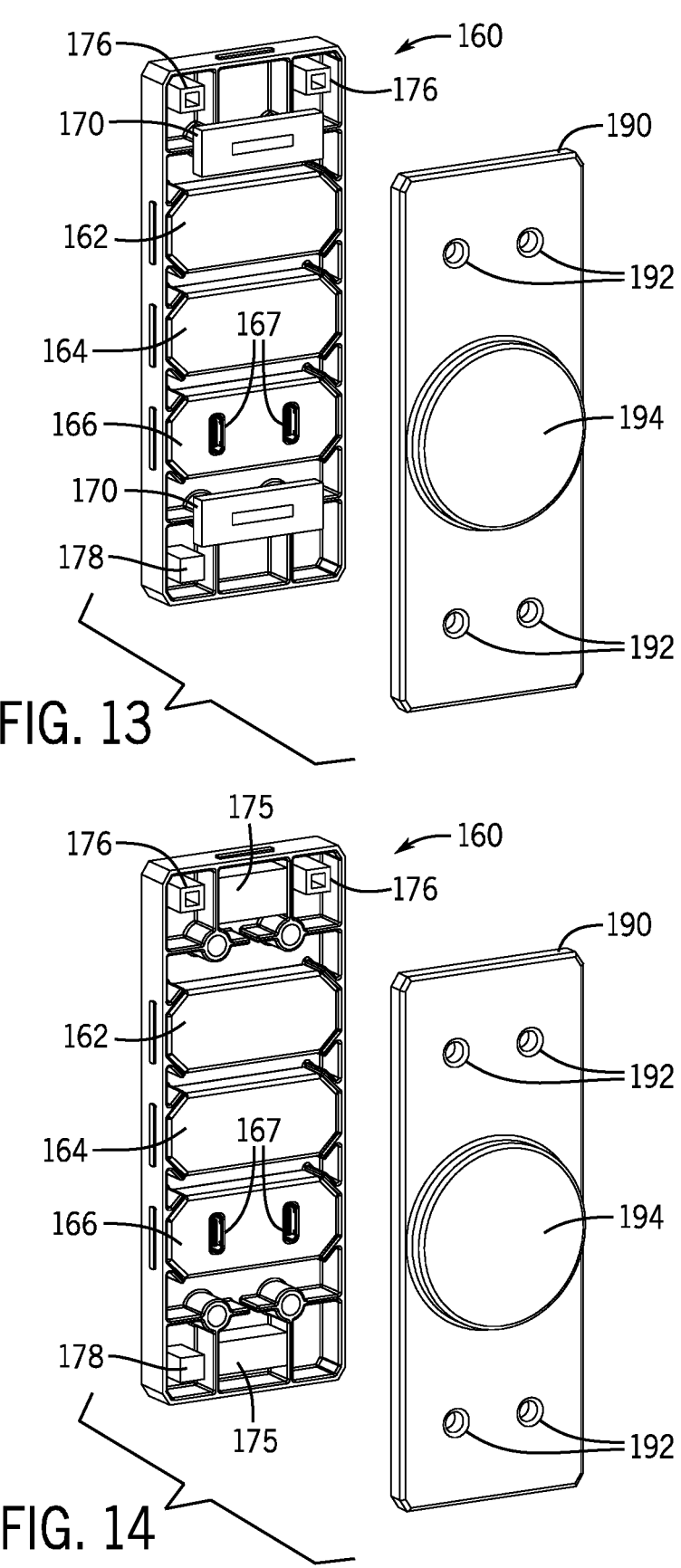
FIG. 13 is a partial exploded view of the mover of FIG. 10 with one embodiment of a mounting assembly to hold a fixture on the modular baseplate.
FIG. 14 is a partial exploded view of the mover of FIG. 10 with an exemplary electromagnet assembly to hold a fixture on the modular baseplate.
Figure 15:
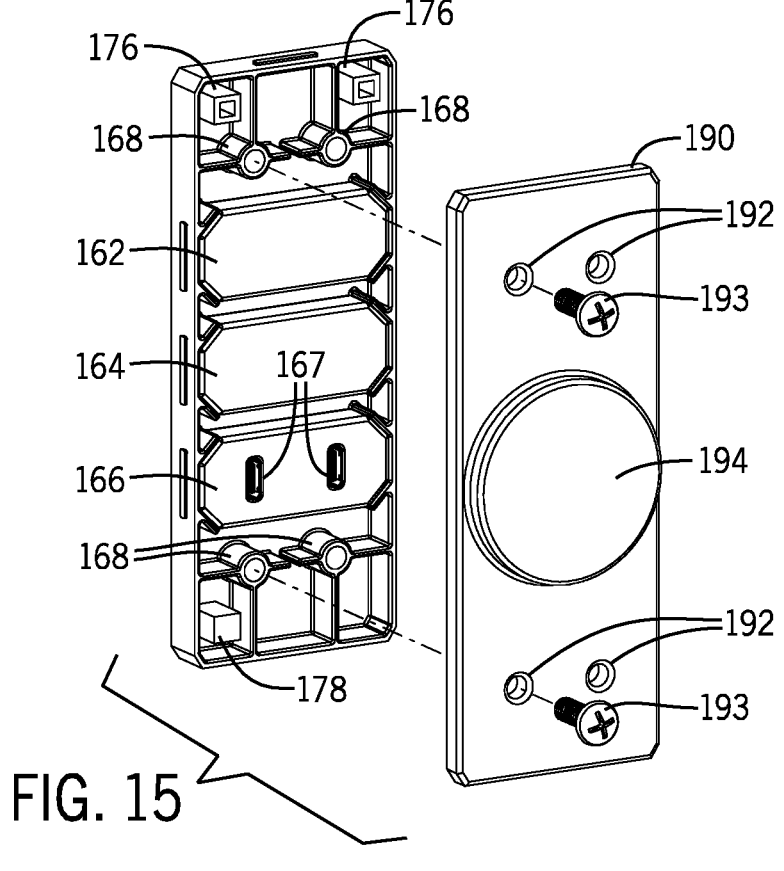
FIG. 15 is a partial exploded view of the mover of FIG. 10 with another embodiment of a mounting assembly to hold a fixture on the modular baseplate.

With reference also to FIGS. 13-15, the mover 100 may utilize one or more different options for securing the secondary mounting plate 190 to the mounting plate 160 on the mover 100. In FIG. 13, an automatic latch 170 is provided within each mounting plate 160 on the mover 100. The automatic latch 170 may be normally in a latched position when power is removed, and in an unlatched position when energized. Thus, power does not need to be continuously applied to the automatic latch 170 to retain the secondary mounting plate 190 for the fixture 194 to the mounting plate 160 on the mover 100. The holes 192 shown on the secondary mounting plate 190 may not extend all the way through the secondary mounting plate, but rather may be threaded channels or the like on the surface of the secondary mounting plate 190 facing the mounting plate 160 for the mover 100. The holes 192 provide a mounting location to affix a complementary latch member 171 on the secondary mounting plate 190. When attaching the secondary mounting plate 190 to the mounting plate 160 on the mover, an actuator is energized, moving the latch 170 on the mover 100 from an engaged position to a disengaged position. For example, a locking plate may slide to one side or a hook may pivot from the engaged position to the disengaged position. The secondary mounting plate 190 is fit to the mounting plate 160 and the actuator for the latch 170 is de-energized. The locking plate slides back or the hook pivots back to the latched position, engaging the complementary latch member 171, such as a slot or loop, affixed to the secondary mounting plate 190 to positively retain the secondary mounting plate 190 to the mounting plate 160 on the mover.

In FIG. 14, electromagnets 175 are provided to secure the secondary mounting plate 190 to the mounting plate 160. The electromagnets 175 are configured to be complementary to a mechanical linkage between the two plates. A mechanical fitting may be provided between the secondary mounting plate 190 and the mounting plate 160 on the mover 100, where the mechanical fitting provides sufficient retention of the secondary mounting plate 190 to the mounting plate 160 to retain the fixture 194 if power is removed. Optionally, electrical connectors between the mounting plate 160 and the secondary mounting plate 190 may provide a sufficient mechanical connection to hold the secondary mounting plate 190 to the mounting plate 160 when a mover 100 is stationary and/or when power is removed from the system. The electromagnet 175 is energized when the secondary mounting plate 190 is mounted on the mover 100, and an electromagnetic field produced by the electromagnet 175 exerts a force on a magnetically receptive surface on the secondary mounting plate 190. A ferrous plate, for example, may be mounted on the surface of the secondary mounting plate 190 opposite the electromagnet 175 in the mounting plate 160. The additional holding force provided by the electromagnets 175 provide stability for the secondary mounting plate 190 as the mover 100 travels along the track 10 or as the tool or fixture on the base 194 engages with a payload present on the mover 100 or with another target eternal from the mover 100.

In FIG. 15, a threaded fastener 193, such as a bolt or screw is shown being inserted through the holes 192 in the secondary mounting plate 190 and into additional threaded channels 168 formed in the mounting plate 160 on the mover 100. A threaded fastener 193 may be utilized to secure secondary mounting plates 190 with heavier tools or fixtures 194 attached to the secondary mounting plate. Similarly, a threaded fastener 193 may provide a more secure connection for an application in which the tool or fixture 194 is configured to receive a heavy payload or apply a greater force to an object external from the mover 100. To provide for a quick changeover between fixtures 194 mounted on the secondary plates 190, a tool changeover station may be provided where a technician has ready access to the threaded fasteners 193. The technician may remove the threaded fasteners 193 from the mover, allowing one secondary plate 190 to be removed and a fixture changer positions a new secondary plate 190 by the mover 100 such that the technician may reinsert the threaded fasteners 193 into the new secondary plate 190. Optionally, the steps of removing and inserting the threaded fasteners 193 may be automated and performed by the fixture changer as well.

Figure 12:
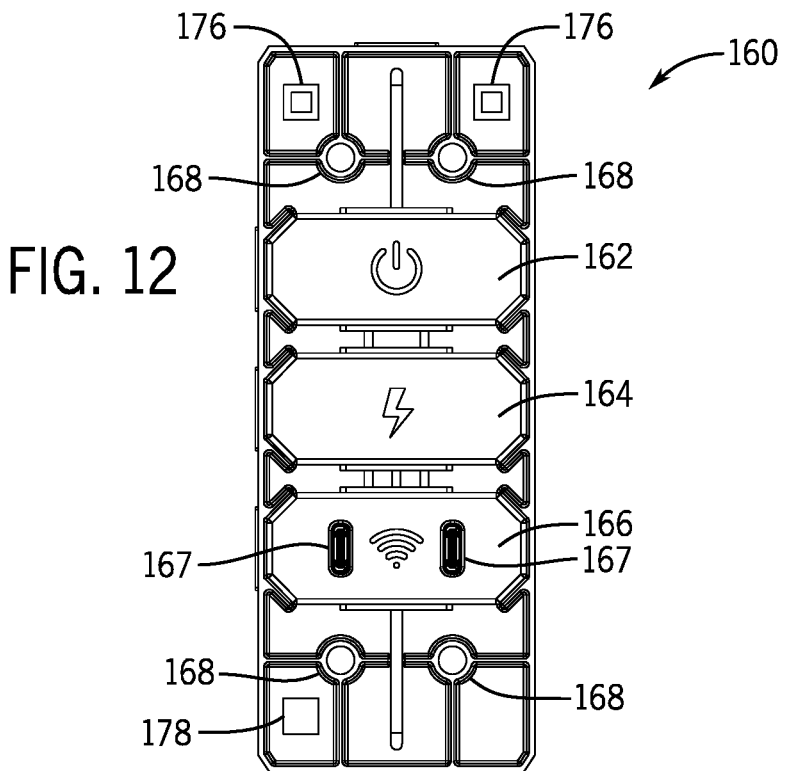
FIG. 12 is a front elevation view of the mover of FIG. 10 with the gripper removed.

Turning next to FIG. 12, it is contemplated that the mounting plate 160 on the mover includes a modular interior, providing for different configurations of mounting plates 160 according to application requirements. The illustrated mounting plate 160 includes three chambers for receiving modules. The number of chambers may vary according to the size of modules utilized and the space available within the mounting plate 160. A first module 162 illustrated is a power module, a second module 164 illustrated is a control module, and a third module 166 illustrated is a communication module. The modules 162, 164, 166 shown are intended to be illustrative and not limiting. In some applications, functions described for one module may be combined with functions of another module.

Figure 4:
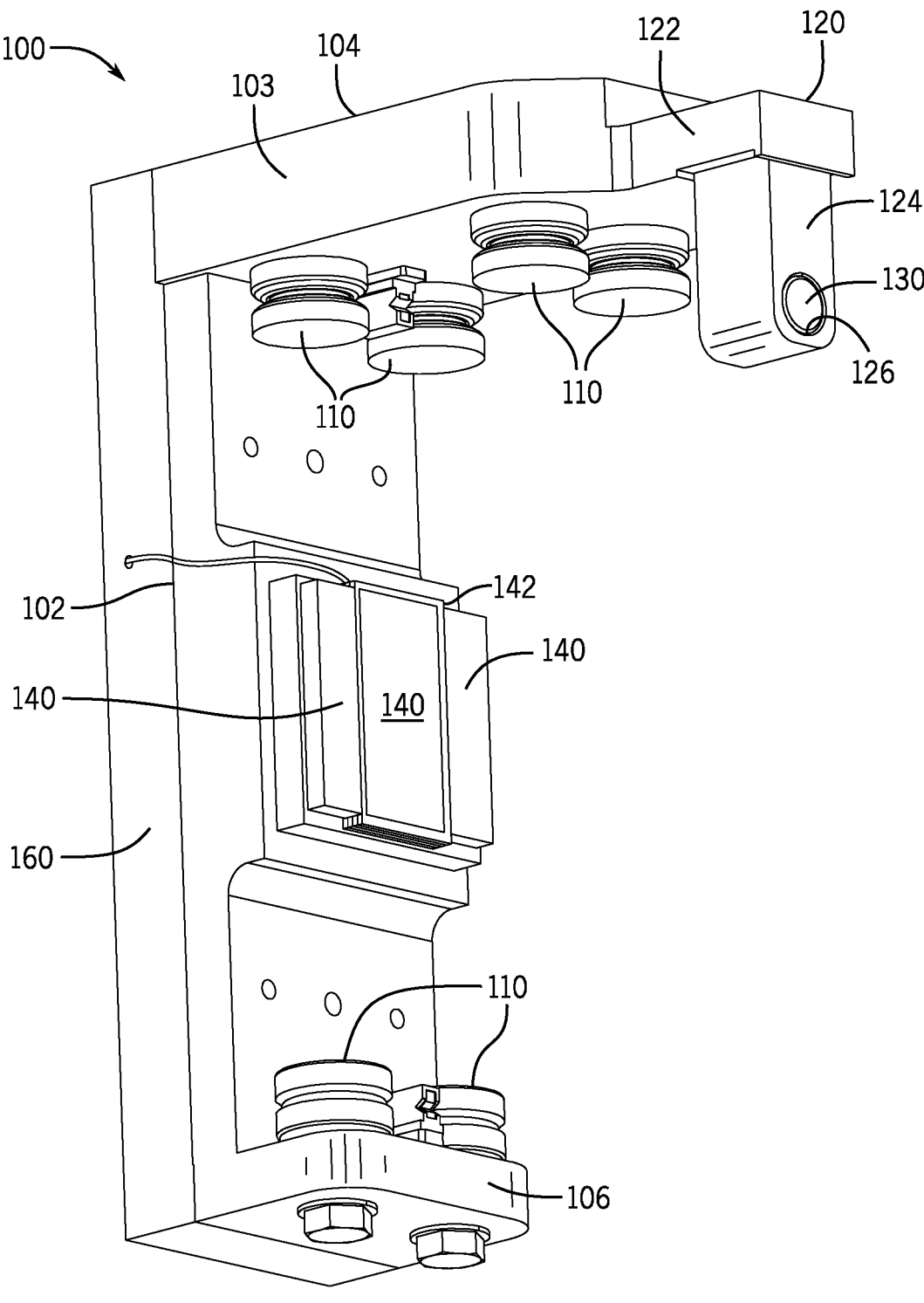
FIG. 4 is an isometric view of a mover from the transport system of FIG. 1.

The power module 162 serves as a power source for other devices mounted on the mover 100 and/or to tools or fixtures present on the secondary mounting plate 190 when the secondary mounting plate 190 is connected to the mounting plate 160. According to one aspect of the invention, the power module 162 includes one or more batteries, capacitors, or other energy storage devices. The batteries may be single-use or rechargeable. With reference also to FIG. 4, the mover 100 may include a pick-up coil 142 which acts as a secondary coil and is configured to receive power wirelessly from a primary coil or from a series of primary coils spaced along the track 10. The pick-up coil 142 may operate and wireless power transfer may occur as described in U.S. Pat. No. 10,985,685 entitled System and Method for Wireless Power Transfer in a Linear Cart System. U.S. Pat. No. 10,985,685 is owned by the Assignee of this application and the entire contents of which is incorporated herein by reference. The pick-up coil 142 is connected to the power module 162 within the base plate 160, and wireless power transfer permits recharging of a battery, capacitor, or other energy storage device within the power module 162. The power module 162 may further include one or more power regulators to supply a desired operating voltage to other devices within the mounting plate 160 or mounted on the secondary mounting plate 190.

The control module 164 is configured to communicate between the base plate 160 and the fixture 194 mounted to the base plate to achieve desired operation of the fixture 194. The control module 164 may include non-transitory memory to store instructions and a processor configured to execute the instructions. The control module 164 may further include additional logic circuits configured, for example, to provide wireless communication external to the mover 100, provide wired or wireless communication with the fixture 194, generate control signals to be passed to the fixture 194, or receive feedback signals from sensors present on the fixture 194. Optionally, communication may be provided by a dedicated communication module 166. The illustrated communication module includes two electrical connectors 167 on a surface of the module 166. Each electrical connector 167 is configured to interface with a complementary electrical connector 169 on the secondary mounting plate 190. The electrical connectors 167 may be a plug with discrete analog or digital signals being transmitted by individual pins or the plug may utilize a serial or parallel communication interface. One of the electrical connectors 167 may be configured to supply power to the fixture 194. A power connector may be configured to receive a voltage, or multiple different voltages from the power module 162. According to yet another option, a power connector may be provided on the power module 162 to deliver power to the fixture 194.

Figure 16:
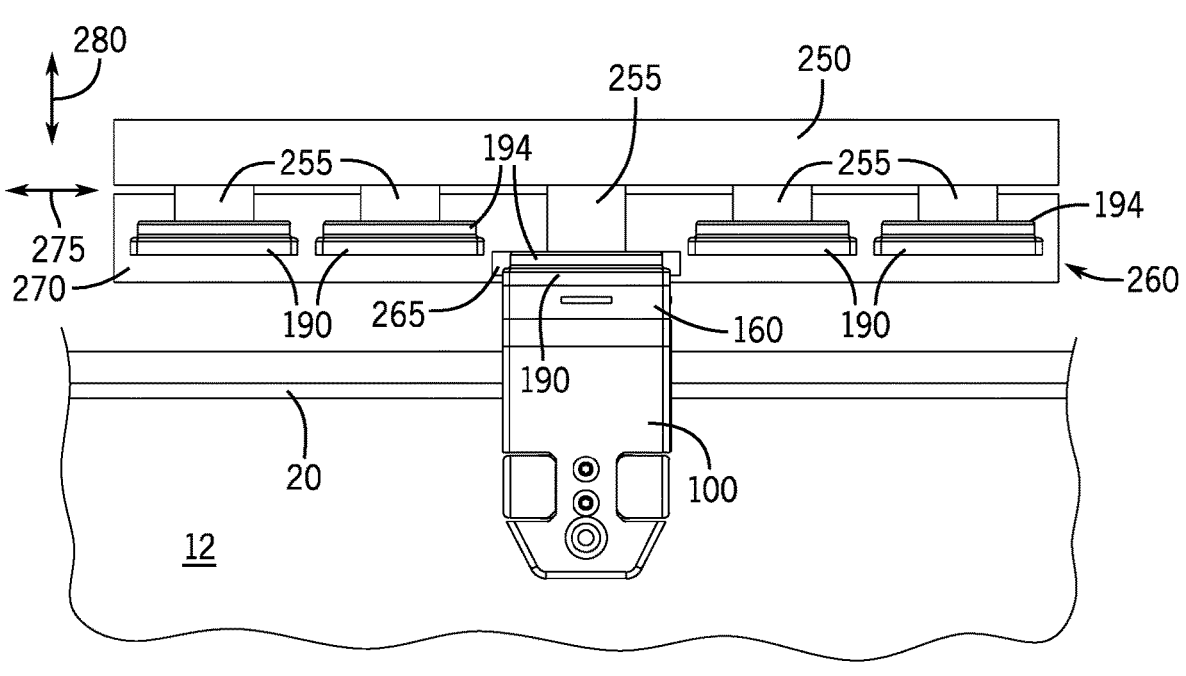
FIG. 16 is a top plan view of a mover positioned by a fixture changer according to one embodiment of the invention.
Figure 17:
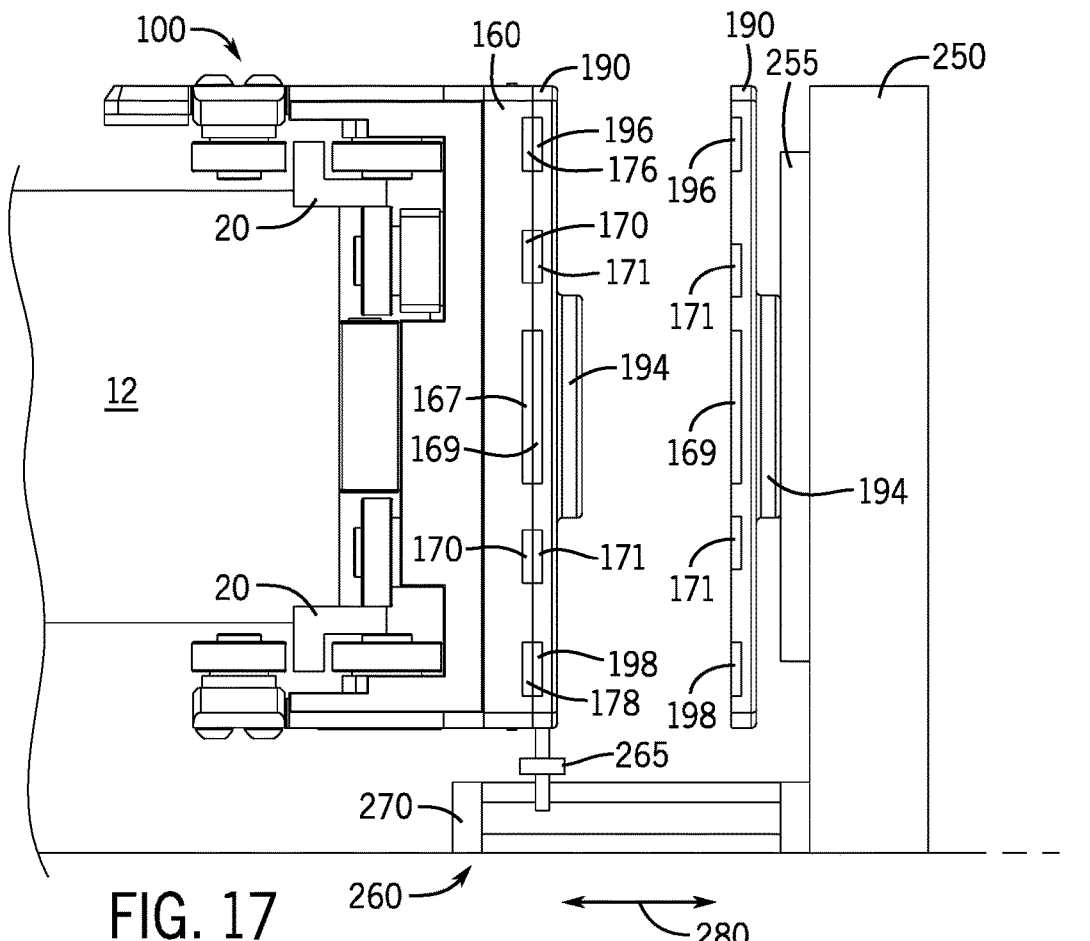
FIG. 17 is a side elevation view of the mover and fixture changer of FIG. 16.

In operation, the mounting plate 160 provides for selectively mounting different fixtures 194 to the mover 100. Turning next to FIGS. 16 and 17, a fixture changer 260 may be provided to facilitate a quick changeover between the different fixtures. The fixture changer 260 includes a fixture station 250 with multiple mounting locations for fixtures 194. Each mounting location may include a mounting assistance device 255. The mounting assistance device 255 may vary by mounting location and as a function of the fixture 194 to be stored at the mounting location. The mounting assistance device may be pneumatic, hydraulic, or electronically actuated and engage the fixture 194 to assist in moving each fixture 194 either away from or toward the corresponding mounting location. According to still another aspect of the invention, the mounting assistance device 255 may be a spring-actuated device to apply a compression force on the fixture and toward the mounting plate 160 when mounting the fixture 194 and secondary mounting plate 190 to the mounting plate.

According to one embodiment of the invention, the fixture station 250 is positioned adjacent to the track 10. The mover 100 is configured to align with each mounting location to either mount one of the fixtures 194 to or dismount one of the fixtures 194 from the mounting plate 160. The mounting assistance device 255 extends from the fixture station 250 a sufficient distance such that the fixture 194 clears the other fixtures remaining on the fixture station 250. A fixture 194 and the corresponding secondary mounting plate 190 for the fixture is secured to the mounting plate 160 via one of the latching mechanisms discussed above. The mounting assistance device 255 then retracts toward the fixture station 250, allowing the mover 100 to travel along the track 10. When a different fixture 194 is needed, the mover 100 first aligns with the empty mounting location. The mounting assistance device 255 extends and attaches to the fixture 194. The latching mechanism between the mounting plate 160 and the secondary mounting plate 190 is released, and the mounting assistance device 255 retracts back to the fixture station 250 bringing the recently used fixture back to the fixture station 250. The mover 100 may then position in front of the next fixture 194 to be mounted on the mover, and the mounting assistance device 255 at the new location extends toward the mover 100 such that the secondary mounting plate 190 for the new fixture 194 engages the mounting plate 160 on the mover 100.

According to another aspect of the invention, the fixture changer 260 includes a platform 265 mounted on a multi-axis shuttle 270 to facilitate changing fixtures 194 on the mover 100. Rather than moving between locations for the fixture station 250, the mover 100 may position itself at a fixture change location. The fixture change location may be in front of the fixture station 250 and aligned with or offset from one of the locations on the fixture station, or the fixture change location may be located offset from the fixture station. The platform 265 is movable in a first axis of motion 275 parallel to the fixture station 250 and in a second axis of motion 280 orthogonal to the fixture station 250. The platform 265 is configured to receive each of the fixtures 194. According to the illustrated embodiment, the platform 265 engages the bottom surface of the secondary mounting plate 190. The platform 265 may include a gripper, actuator, or other mechanical coupling to hold the secondary mounting plate 190 on the platform 265. The platform 265 is movable to each of the locations on the fixture station 250 to access each of the fixtures 194 mounted on the fixture station. The platform 265 is also movable to the fixture change location to engage the mover 100 when the mover is present at the fixture change location. The platform 265 is selectively located by one of the fixture locations to retrieve a desired fixture 194. The platform 265 moves on the multi-axis shuttle to the mover 100, such that the secondary mounting plate 190 on the desired fixture engages the mounting plate 160 on the mover. The latching mechanism on the mounting plate 160 secures the desired fixture 194 to the mover 100, and the platform 265 moves away from the fixture change location, allowing the mover 100 to travel along the track 10. When an existing fixture 194 is present on the mover 100 and a new fixture 194 is needed, the mover 100 travels to the fixture change location. The platform 265 is positioned under the secondary mounting plate 190 for the fixture 194 attached to the mover, and the latching mechanism on the mover 100 disengages the secondary mounting plate 190 from the mounting plate. The platform 265 returns the old fixture 194 to its location on the fixture station 250 before loading a new fixture 194 on the mover 100.

According to another aspect of the invention, the mounting plate 160 and the secondary mounting plate 190 each include at least one half of a pair of complementary alignment devices to facilitate alignment of the secondary mounting plate 190 with the mounting plate 160. According to the illustrated embodiment, the mounting plate 160 includes a first alignment channel 176 and a second alignment channel 176. Each of the alignment channels 176 are located near one end and on opposite sides of the mounting plate 160. The alignment channel 176 may have a wider periphery near the opening and taper to a smaller periphery near the bottom of the channel 176. A complementary guide pin 196 extends from the secondary mounting plate 190 to engage the alignment channel as the secondary mounting plate 190 approaches the mounting plate. The wider periphery at the opening of the alignment channel 176 allows for some misalignment of the secondary mounting plate 190 with the mounting plate 160 and still have the guide pin 196 enter the alignment channel 176. The size of the periphery of the guide pin 196 corresponds to the size of the periphery of the bottom of the channel 176. Consequently, the guide pin draws the secondary mounting plate 190 into alignment with the mounting plate 160 as the guide pin is inserted further into the alignment channel. It is contemplated that the guide pins 196 may be mounted on the mounting plate 160 and the alignment channels 176 mounted on the secondary mounting plate 190.

According to still another aspect of the invention, each fixture 194 may include an identification tag 198 mounted on the fixture that may be read by the mover 100 to verify that the desired fixture 194 is present on the mover 100. A near-field communication (NFC) device 178 is included on the mounting plate 160 and is configured to read the identification tag 198 present on the secondary mounting plate. According to one aspect of the invention, the NFC device communicates according to radio frequency identification (RFID) protocols. The identification tag 198 is a RFID tag that receives power from the RFID reader 178 and transmits an identifier value unique to the RFID tag 198 on the fixture 194. The control module 164 on the mounting plate 160 may be configured to read the identifier and generate control signals to the fixture 194 as a function of the RFID tag 198 detected. Optionally, the control module 164 may be configured to communicate with the segment controller 200 or system controller 30 to transmit the identifier to the controller and to receive control signals corresponding to desired operation of the fixture 194 mounted to the mover 100. According to still other embodiments of the invention, other short-range communication protocols may be utilized, such as Bluetooth, Bluetooth Low Energy, Zigbee, and the like to communicate between a reader 178 present on the mounting plate 160 and an identification tag 198 present on the secondary mounting plate 190.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. An apparatus for selectively mounting a fixture on a mover for an independent cart system, the apparatus comprising:
   a mounting plate secured to the mover, wherein the mounting plate includes:
      at least one electrical connector configured to engage a complementary electrical connector on each of a plurality of fixtures,
      at least one connector configured to engage a complementary connector on each of the plurality of fixtures to positively retain each of the plurality of fixtures to the mounting plate, and a control circuit operative to communicate at least one control signal between the mounting plate and each of the plurality of fixtures; and a fixture station having a plurality of mounting locations, wherein each of the plurality of fixtures is stored on one of the plurality of mounting locations for the fixture station.

2. The apparatus of claim 1 further comprising a fixture changer, wherein:

the fixture changer is selectively located by each of the plurality of mounting locations to transfer one of the plurality of fixtures between the fixture changer and the corresponding mounting location, and the fixture changer is selectively located by the mover to transfer one of the plurality of fixtures between the fixture changer and the mover.

3. The apparatus of claim 1 wherein the mover is selectively positioned by each of the plurality of mounting locations to mount the corresponding fixture to or dismount the corresponding fixture from the mover.

4. The apparatus of claim 1, wherein the at least one connector includes an actuator to engage and disengage the at least one connector with the complementary connector on each of the plurality of fixtures.

5. The apparatus of claim 1, wherein:

the at least one electrical connector receives power from at least one secondary coil mounted on the mover;

the at least one secondary coil is configured to receive the power across an air gap from at least one primary coil mounted along a track on which the mover travels;

the at least one primary coil receives the power from a power supply mounted external from the mover; and the at least one electrical connector transfers the power to the complementary electrical connector on each of the plurality of fixtures.

6. The apparatus of claim 1 further comprising a power source configured to supply electrical power to at least one device mounted on the mover.

7. The apparatus of claim 6, wherein the power source further comprises a first power coupling member configured to engage a complementary, second power coupling member, wherein the second power coupling member receives power from a power supply mounted external from the mover.

8. The apparatus of claim 7, wherein:

the first power coupling member is at least one secondary, pick-up coil mounted on the mover; and the second power coupling member is at least one primary coil mounted along a track on which the mover travels.

9. The apparatus of claim 6, wherein the power source is an energy storage device mounted on the mover.

10. A method for selectively mounting a fixture on a mover for an independent cart system, the method comprising the steps of:

aligning the mover with a fixture station having a plurality of mounting locations, wherein each of the plurality of mounting locations stores one of a plurality of fixtures and wherein the fixture to be mounted is selected from the plurality of fixtures;

mounting the fixture to a mounting plate on the mover, wherein the mounting plate includes:

at least one electrical connector configured to engage a complementary electrical connector on the fixture, at least one connector configured to engage a complementary connector on the fixture to positively retain the fixture to the mounting plate, and a control circuit operative to communicate at least one control signal between the mounting plate and the fixture; and securing the fixture to the mounting plate by engaging the complementary connector on the fixture to the at least one connector on the mounting plate.

11. The method of claim 10 wherein the step of aligning the mover with one of the plurality of fixtures further comprises the steps of:

positioning the mover at a fixture change location for the fixture station;

transferring one of the plurality of fixtures from one of the plurality of mounting locations to a fixture changer; and positioning the fixture changer at the fixture change location.

12. The method of claim 10 wherein the step of aligning the mover with one of the plurality of fixtures further comprises the step of positioning the mover at one of the plurality of mounting locations for the fixture station.

13. The method of claim 10, wherein the at least one connector includes an actuator selectively engaging and disengaging the at least one connector with the complementary connector on the fixture.

14. The method of claim 10 further comprising the step of transferring power from a power supply mounted external from the mover to the mover via a first power coupling member mounted on the mover, the first power coupling member configured to engage a complementary, second power coupling member receiving power from the power supply.

15. The method of claim 14, wherein:

the first power coupling member is at least one secondary, pick-up coil mounted on the mover; and the second power coupling member is at least one primary coil mounted along a track on which the mover travels.

16. The method of claim 10 further comprising the step of supplying electrical power to at least one device mounted on the mover from an energy storage device mounted on the mover.

* * * * *